United States Patent

[11] 3,530,759

| [72] | Inventor | Gus Francis<br>29 Polo Club Circle, Denver, Colorado 80209 |
|---|---|---|
| [21] | Appl. No. | 801,037 |
| [22] | Filed | Feb. 20, 1969 |
| [45] | Patented | Sept. 29, 1970 |

[54] EXPLOSIVELY SEVERABLE ELEMENT
10 Claims, 4 Drawing Figs.

[52] U.S. Cl. .................................................. 85/1, 89/1
[51] Int. Cl. ...................................................... F16b 35/00, F41f 5/02
[50] Field of Search ..................... 85/1 (Explosive Digest), 65, 37, 72; 89/1.01, 1, 1.5; 102/28, 28M

[56] References Cited
UNITED STATES PATENTS

| 2,415,560 | 2/1947 | Higley | 85/65 |
| 2,653,504 | 9/1953 | Smith | 85/1 |
| 3,084,597 | 4/1963 | Beyer | 89/1.01 |
| 3,196,746 | 7/1965 | Dahl | 85/1X |
| 3,237,521 | 3/1966 | Francis | 85/1X |
| 3,352,189 | 11/1967 | Brown | 85/1 |

FOREIGN PATENTS

| 737,480 | 7/1943 | Germany | 85/65 |

Primary Examiner—Ramon S. Britts
Attorney—Sheridan and Ross

ABSTRACT: An explosively severable element, such as an explosive bolt, and a method for severing the element with substantially no noise, and little or no shock being imparted to the severed parts, which comprises enclosing internally of the element and proximate the severing area a quantity of liquid or a malleable metallic substance and applying force to the enclosed material to create in the severing area of the element outwardly directed circumferential hoop stresses and axially directed tensile stresses to sever the element.

Patented Sept. 29, 1970

3,530,759

INVENTOR.
GUS FRANCIS
BY Sheridan and Ross
ATTORNEYS

3,530,759

EXPLOSIVELY SEVERABLE ELEMENT

This invention relates to a severable element which can be severed instantaneously for various purposes, more particularly, it relates to a severable fastening element, such as an explosive bolt, which can be severed with little or no noise and with minimum shock being imparted to the element separated.

Severable elements fastening two parts together, such as explosive bolts, are used widely in connection with space missiles, rocket boosters, multi-stage rockets, commercial vehicles, cranes, ships, and in other applications where instantaneous separation of two elements is required. Present explosive release devices, and particularly explosive bolts, subject to the disadvantage that the explosion separating or breaking them is accompanied by noise, shock, flying fragments, and the expulsion of propellant gases into the system or into the atmosphere.

The noise and shock resulting in the escape of propellant by-products from the partially opened severable element is severe enough to disrupt sensitive electronic circuits, break communication lines, rupture liquid carrying pipes, etc. causing malfunctioning and even failure of the missile, rocket, booster, or other device with which the explosive bolt is used.

The release of gaseous by-products into the surrounding environment from the partially open severable element is objectionable in many space, surface and underwater devices, as these by-products can contaminate the surrounding environment, and are capable of building up corrosive by-products on critical items, such as wires, tubes, mirrors, electrical control mechanisms, and other critical and sensitive elements. This is particularly true in the case of space boosters or manned orbiting laboratories wherein the release of propellant by-products from the explosive bolts used in separating functions can contaminate the environment to such a degree to endanger the lives of the occupants and to damage critical laboratory equipment.

It is highly important in explosive released devices to eliminate ejection velocities of the separated components and the fragmentation of the walls of the severable element. Fragments resulting from the bursting of the walls of the explosive bolt may result in missile failures, and are a hazard to personnel in the vicinity of the device with which the explosive bolt is used.

U.S. Pat. No. 3,352,189, discloses an explosive bolt designed to minimize noise from the explosion. This bolt includes an explosively actuated plunger which shears the severable element. This in itself would result in substantial noise. Further, the chamber housing the explosion is open to the atmosphere, so that propellant gases resulting from denotation of the explosion can escape to the atmosphere resulting in substantial noise, and contamination of the surrounding area.

In the present invention the severable element is severed by outwardly directed circumferential hoop stresses in the breaking area and simultaneous axially directed tensile stresses in the severing area, the stresses being provided by pressure from a malleable metallic material subjected to extreme forces by the explosion. Upon explosion, the severable element is completely sealed against the release of gases to the outside atmosphere.

The invention embodied in the form of an explosive bolt comprises an elongated bolt adapted to hold two parts together, the bolt being provided with a chamber in its upper end, a malleable metallic material in the bottom of the chamber, an actuating plunger adjacent the malleable metallic material, an explosive adjacent the plunger, a detonater for the explosive, and means for sealing off propellant gases from the environment when the explosion is detonated. Upon detonation of the explosive, the top of the chamber is sealed against release of propellant gases, and the plunger is driven forward a given distance to seat on shoulders in the channel, and to exert a tremendous force on the malleable metallic material to result in outwardly directed circumferential hoop stresses and axially directed tensile stresses at the breaking area to sever the bolt.

The invention is described herein by its application to an explosive bolt; however, it is not limited to this application as the invention in its broadest aspects can be used in various other applications wherein severable elements are required.

The invention will now be described in conjunction with accompanying drawings in which.

Figure 1:
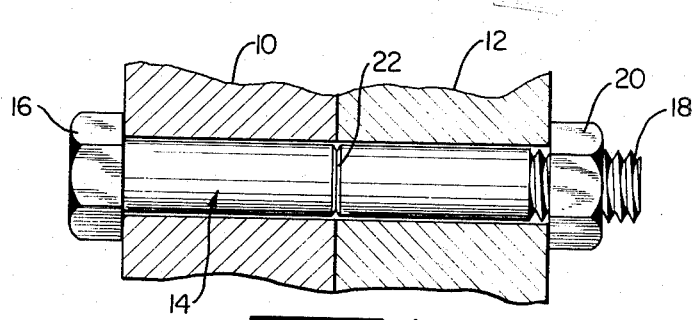
FIG. 1 is a partial sectional view of an assembly of two walls joined together by the explosively severable fastening element of the invention.

Referring to FIG. 1, there is shown two severable parts 10 and 12 held together by explosive bolt 14 comprised of metal body 15, head 16 and threaded end 18 upon which is screwed tap 20 to hold the parts 10 and 12 securely together. The explosive bolt or severable element is provided with a centrally located circumferentially extending reduced diameter section 22.

Figure 2:
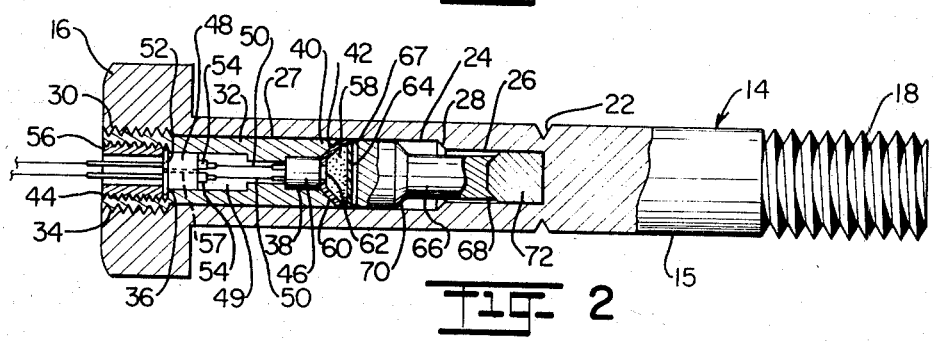
FIG. 2 is a cross-sectional view of an explosive bolt sectioned to show the internal structure and arrangement of the parts thereof.

Referring now to FIG. 2, the bolt has been sectioned in its upper half to show the internal assembly of parts through which separation of the bolt is accomplished.

The bolt is provided with a central channel 24 having a reduced diameter lower section 26, and an upper section 27 coaxial therewith, with shoulder 28 separating the two sections. The upper end of channel 24 is provided with female threads 30.

For supporting part of the internal assembly of the bolt, cylindrical insert 32 is seated inside channel 24 by means of male threads 34 at its upper end which mate with female threads 30 of the channel 24. The insert 32 is hollow and is constructed with internal shoulders 36 and 38 in its interior channel. The insert has a skirt portion 40 at its bottom end which forms a concave hollow section 42 at the bottom of the insert. Female threads 44 are cut internally of the upper end of the insert 32.

The insert assembly includes the detonator 46 and the plug 48 which supports the lead wires 50 for the detonators 46. The plug 48 has a rim 52 which seats on the internal shoulder 36 when the insert assembly is in position. The top of the detonator 46 seats against the shoulder 38 so that the detonator is positioned entirely within the lower portion of the channel of the insert below shoulder 38. In order to secure a complete closure at the top of the insert channel 32, the lead wires 50 are potted into the metal plug 48 so that they are completely sealed and insulated against the metal plug. On the bottom side of the plug 48 the lead wires 50 are soldered into metallic sealing pins 54 which pass through the plug and are sealed by potting into the plug. The potting provides electrical insulation between the pins 54 and the metal plug 48. The internal ends of the lead wires are soldered into the detonator 46.

In assemblying the insert assembly, the lead wires 50 are first passed through the channel of the insert 32 and their lower ends soldered into the lead terminals of the detonator 46. The detonator is then seated in its compartment against shoulder 38 and the upper ends of the lead wires are soldered to the lower ends of lead wires protruding from the pins 54. The lead wires 50 are made long enough so that the plug 48 can be pulled outside of the insert 32 to permit soldering of the lead wires together and to permit the insertion of the solid potting in the cavity 49 between the plug 48 and the detonator 46 upon final assembly of the cylindrical insert 32. The plug 48 is seated against the shoulder 36 after filling of the cavity with liquid potting and with the detonator in its compartment. A hollow ferrule 56 provided with male threads on its outside surface is threaddedly attached to the female threads 44 at the top of the insert to secure the rim 52 against the shoulder 36. A small diameter air duct 57 is the only opening from the interior of the channel of the insert to the outside when the insert is assembled in position. The purpose of the air duct is to permit entrapped air to escape when the liquid potting is added upon assembly thereby insuring a solid section between the plug 48 and the detonator 46 when the potting hardens in the cavity 49.

To supply the force required to break the bolt, an explosive charge 58 is encapsulated in cone-shaped capsule 60 provided with gap 62, the capsule 60 filling in the hollow cone-shaped portion 42 of the insert 32. A nylon cap 64 fits snuggly against the bottom of capsule 60. The explosive is preferably high explosive, such as, RDX, PETN, TNT, COMPB and COMPC, while the caps 64 are made of nylon or other suitable plastic. Capsule 60 and propellants or a gas pressure generator may be used instead of the explosive. The shape of the explosive charge 58 and the capsule 60, as well as the shape of the receiving cavity 42 are not critical, and other shapes may be used. The metal body 15 surrounding the explosive must be strong enough to contain the explosive forces without appreciable distortion.

A metal piston 66 is positioned downwardly adjacent the cap 64. The piston is constructed with upper piston skirt 67 and lower piston skirt 68 for a purpose which will be described later. An external shoulder 70 is formed on the piston 66 between its upper large diameter section and its lower smaller diameter section. The external shoulder 70 mates with internal shoulder 28 on the inside of channel 24, the latter providing a stop for the downward travel of the piston 66.

The final element of the internal assembly of the bolt is a slug 72 of a malleable metallic material which is positioned in the bottom of channel 24. The bottom of slug 72 is flat and is shown in line with the reduced diameter section 22 which constitutes the breaking area of the bolt. It is not necessary that the bottom of the slug 72 and the reduced diameter area 22 be in line, as it is only necessary that the slug 72 be positioned proximate the breaking area of the bolt. For the purposes of the invention, the slug 72 must be a malleable metallic material or a liquid. Metallic materials which may be used are lead, silver, gold, copper, aluminum, bismuth, and their alloys, and other malleable metals and their alloys. Lead and its alloys are the preferred metals because of the cheapness of lead. The material must be one which spreads under pressure without disintegrating. It must be substantially incompressible and capable of transmitting force from the piston into hoop stresses which act circumferentially outwardly against the breaking area of the bolt, as well as axially directed tensile stresses. Liquids, such as, water, mercury, oils, and other liquids may be used.

The assembly of the internal parts of the severable element and the operation of the severable element, will now be described with reference to FIG. 2. The required amount of liquid or malleable metallic material 72 is positioned in the bottom of section 26. Piston 66 is next inserted in the channel 24 with its small diameter end contacting the slug 72. This is followed by insertion of capsule 60 loaded with explosive, with the cone-shaped side of the section facing outwardly. The cylindrical insert 32, assembled as described above, is next inserted with its conically shaped skirt 40 fitting over the conically shaped end of the capsule 60 and screwed into place. The device is now ready for severing by application of current to the detonator 46.

The severable element can be used to secure two parts together for later separation of the parts as shown in FIG. 1, or the severable element can be used in other applications wherein it is not used to hold two parts together before severing.

Figure 3:
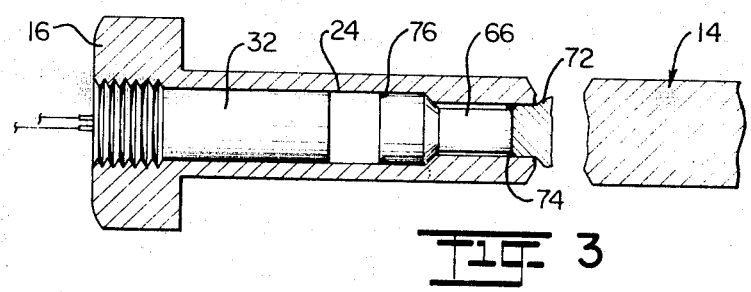
FIG. 3 is a partial sectional view showing the explosive bolt of the invention after it has been broken.
Figure 4:
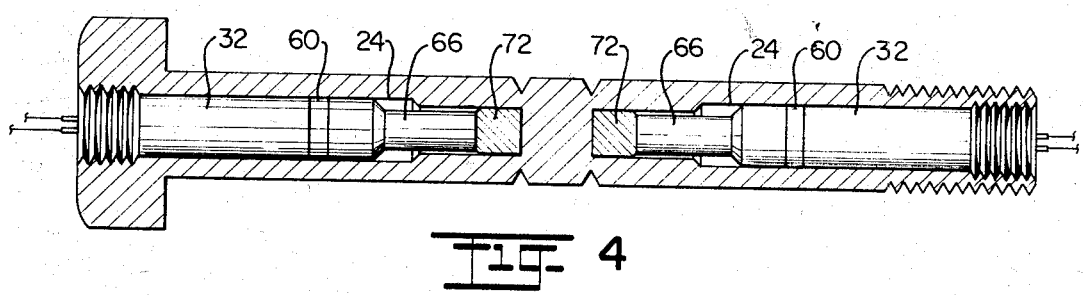
FIG. 4 is a longitudinal sectional view of a double explosive bolt of the invention used in applications where redundancy is required.

When current is applied to the detonator 46 to detonate it, the explosive charge 78 is in turn detonated to force the plunger 66 forward against the material 72. The tremendous pressure against liquid or malleable metallic material 72 results in circumferential outwardly directed hoop stresses in the breaking area as well as forwardly directed axial stresses with the result that the severable element is severed in the breaking area. As the plunger moves downward to seat against shoulder 28, the outer thin edge of the skirt 68 forms a seal 74 (FIG. 3) to prevent the material 72 from traveling upwardly around the piston. When the piston is driven downwardly by the explosion of explosive 58, the pressure on the top of the piston deforms the thin edge of the upper skirt 67 into a seal 76 (FIG. 3) which prevents gases from the explosion from traveling down around the piston.

Upon the detonation of detonator 46 and explosive 58, large pressures are exerted upwardly into the area beneath plug 48. The result is that the rim 52 of the plug 48 is seated and sealed against the shoulder 36, the air channel 57 is sealed as the high pressure forces potting material into the channel. Further, the sealing pins 54 are compressed against the bottom of the plug 48 thereby seating and sealing the openings to insure that the lead wire channels in the plug are securely sealed. The result is that a complete seal is formed in the upper end of channel 24 to prevent the escape of any gas from channel 24.

Since no gases resulting from the explosion escape to the atmosphere, no sound waves are formed to create noise. As the internal end of channel 24 is closed by seals 74 and 76, no combustion gases escape through the lower end of the channel. Due to the manner of breaking the severable element by means of hoop and tensile stresses, there is no recoil or propulsion effect on the separated parts, and no flying fragments are produced to cause damage to neighboring assemblies.

The invention provides an explosively severable element in which all of the propellant or combustion gases resulting from detonation of the explosive elements are sealed within the severable element to prevent their escape to the atmosphere to form sound waves. The severing of the element is accomplished by hoop and tensile stresses resulting from pressure upon a liquid or malleable metallic material, with the result that the breaking is effected without noise, recoil or propulsion of separated parts, or the formation of fragments.

The severable element of the invention is useful in the applications hereinabove mentioned wherein it is necessary to dampen noise and prevent recoil of separated parts and the production of fragments. The element is particularly useful in armament and rocket applications wherein noise must be controlled and sensitive elements, such as, circuit elements and electrical control mechanisms must not be damaged on separation of the parts held together by the severable element. The invention includes the severable element in combination with the element or parts to be severed.

I claim:

1. A severable element for use as a quick-disconnect connecting means and for other uses, comprising: a body: a chamber extending from an outer end of said body; a quantity of material in the inner end of said chamber which is substantially incompressible and is capable of being spread under pressure without disintegrating; an annular groove in said body defining a circumferential severing area of reduced cross-section; the inner end of said material being proximate said severing area; and means for applying pressure to said material to deform it and sever said element including a plunger having its inner end adjacent said material.

2. The combination of at least two separable elements connected together with the severable element of claim 1.

3. The severable element of claim 1 in which said material is a malleable metallic material.

4. The severable element of claim 1 in which said material is a liquid.

5. The severable element of claim 1 in which said chamber is sealed against the escape of gas therefrom.

6. The severable element of claim 1 including means for limiting the forward travel of said plunger.

7. The severable element of claim 1 including sealing means at either end of said plunger.

8. The severable element of claim 1 in which said pressure applying means is an explosive and including detonation means in said chamber for said explosive and means for actuating said detonation means, said chamber being sealed against the escape of gas therefrom.

9. The severable element of claim 1 in which said pressure applying means is a gas pressure generating means such as a propellant powder.

10. The severable element of claim 1 including a second severable element of the identical structure of claim 1 attached to the end of said severable element with said quantity of material of both elements adjacent.